Patented Feb. 23, 1943

2,311,629

UNITED STATES PATENT OFFICE 2,311,629

INSECTICIDE SPRAY MATERIAL AND METHOD OF MAKING THE SAME

Robert B. Arnold, Stonewall Courts, Va., assignor to Tobacco By-Products and Chemical Corporation, Louisville, Ky., a corporation of Delaware No Drawing. Application June 14, 1940,
Serial No. 340,523

8 Claims. (Cl. 167—33)

This invention relates to a spray material and to a process of making the same.

In my application, Serial No. 186,301, filed Jan. 22, 1938, for Insecticides and process of making the same, Patent No. 2,219,287, I have disclosed a spray material which comprises a series of ingredients, one of which is a complex solid polysilicate of an insecticidal alkaloid selected from the group consisting of nicotine, nornicotine, anabasine, on which solid there is adsorbed an excess of a water-soluble, volatilizable salt of the same alkaloid. With this polysilicate of alkaloid surcharged with a salt of the same alkaloid, there is mixed a sufficient quantity of raw, that is, unacted upon, complex polysilicate, which, when the mixture is added to water in the spray tank, will react with the surcharge of alkaloid salt to produce more polysilicate of the alkaloid. This results in a very effective stomach poison for chewing insects. I have discovered that the same complex polysilicate of an alkaloid of the group named hereinbefore, and carrying a surcharge of alkaloid salt, may be used, without the addition of the said raw polysilicate, as a spray material for making a combination spray. The resulting product may be prepared at the factory and shipped to a consumer for use in making an insecticide spray which will be exceedingly effective not only as a stomach poison, to protect a plant against chewing insects, but also as a contact poison to destroy sucking insects on said plant at the time of spraying. Also, I have discovered that while the complex polysilicate of an insecticidal alkaloid of the group named hereinbefore carrying a surcharge of salt of the named alkaloid in volatilizable form will lose some of its lethal strength with lapse of time unless packaged in air-tight moisture-proof containers, it will when so packed retain substantially all its lethal strength, and, furthermore, I have found that the rate of its loss of strength is slow enough to allow such a spray material to be delivered to a consumer, even in non-hermetic packages, and still be valuable as a spray material, where the time of storage, transportation and delivery is not too great.

The invention constituting the subject matter of the present application, which is a continuation in part of my said application Serial No. 186,301, hereinbefore named, comprises a solid comminuted water-insoluble salt of an insecticidal alkaloid selected from the group consisting of nicotine, nornicotine, anabasine, surcharged with a substantial proportion of a water-soluble salt of an alkaloid selected from the said group, the whole product being a dry, finely comminuted material in discrete particles, which may be poured into containers, and may be made to carry a relatively high total proportion of the insecticidal alkaloid. In the best embodiment of the invention the alkaloid which is fixed in chemical combination with the said insoluble salt is identical with that in the water-soluble volatilizable salt in dry form, which is carried by the discrete particles of the said insoluble salt.

The invention also includes the process of making the spray material, an essential feature of which consists in contacting an adsorbent material having suitable base-exchange properties with a water-soluble salt of an insecticidal alkaloid selected from the group consisting of nicotine, nornicotine, anabasine, in the presence of a restricted amount of water, the proportion of alkaloid salt being in substantial excess of that which would supply alkaloid to satisfy the base-exchange properties of the said adsorbent material, maintaining such contact of the said ingredients for such time and at such temperatures that the base-exchange reaction between the adsorbent material and the alkaloid will proceed to completion of the base-exchange reaction, that is, to the point where the base-exchange material has chemically combined with the maximum amount of alkaloid it will take in chemical combination, and thereafter heating the product to drive off all or substantially all the moisture which was present during the reaction. During this drying operation, which should be carried out with continuous mixing, the excess salt of the alkaloid gradually takes a jelly-like or gelatinous form, coating the discrete particles of the solid adsorbent material and as the heating proceeds will be finally adsorbed by such particles. The dried material, which may be somewhat lumpy, is ground and graded as by air-separation or sifting, so that the finished product is a substantially dry powder whose particles are non-adherent, and will flow readily, thus making handling of the material by chutes or conveyers very easy.

It has been found that a complex polysilicate which has base-exchange properties is particularly suitable for carrying out the present invention, and such a material may be found in the general class of raw materials known as bentonites, which class, however, includes some materials not so satisfactory for applicant's purpose. It has been found that certain Wyoming bentonites known on the market as Volclay or Wilkinite and some California bentonites known as Filtrol and "Stay-up" are excellent for carrying out the present invention. These satisfactory bentonites may be classified as complex poly-alumino-silicates having base-exchange properties. (Sometimes the aluminum is replaced in part by trivalent iron.)

Such silicates hold in combination divalent and monovalent metals, for example, calcium, magnesium, sodium and sometimes potassium, and in general the alkaloid replaces part of such divalent or monovalent metals in the base-exchange reaction and thereby enters into chemical combination with the poly-alumino- (or ferro- or alumino-ferro) silicate.

When using the best types of complex polysilicates above mentioned, to form a chemical combination with the alkaloid selected, it will be found that the resultant product gives a durable alkaloid combination from which the chemically combined alkaloid will not be dissolved out by water, nor will the alkaloid, such as nicotine, nornicotine, or anabasine readily escape from the combination by volatilization. In other words the alkaloid may be said to be fixed.

The complex poly-alumino-, ferro-, or alumino-ferro-silicates to be employed in carrying out the invention, in addition to their base-exchange properties, also have strong adsorptive power, and in the present invention that power is utilized. Such a material usually contains some free water.

The water-soluble salts of the insecticidal alkaloid selected are those in which the alkaloid in salt form is volatilizable, at least in part, that is to say, when the salt is in solution in water, as the water evaporates, a part of the alkaloid will be set free in gaseous or vapor form. In usual practice the nicotine salts are employed, and of these nicotine sulphate is more readily available and most economical. The usual preparation of nicotine sulphate has about 40% nicotine strength and is accompanied by about 40% water. About one-half its nicotine may volatilize, but the remainder is retained.

It is to be understood that an important feature of the product of the present invention is its concentrated insecticidal strength. For example, it is practical by this invention to produce a nicotine spray material having as high as about 14% to 18% nicotine strength, which, as well known to those skilled in the art, is much above the nicotine strength of prior dry powdered spray products containing nicotine. It has been found in practice that about 8 to 10% nicotine is about the limit of strength for the complex polysilicate of nicotine, and apparently the highest concentration per unit weight of the final product is attained when the adsorbed nicotine salt on the solid polysilicate of nicotine carries about the same percentage of nicotine as exists in chemical combination with the said solid polysilicate, namely about 8%.

However, it has been found in practice that the use of too great a surcharge of nicotine salt on the solid polysilicate particles is likely to result in a product which may cake or become lumpy when standing, even if kept in hermetically sealed packages. This difficulty is not encountered if the amount of nicotine salt used in making the product is not more than that necessary to give a total of about 15% nicotine in the finished dry product, which nicotine is carried about one-half chemically bound with the polysilicate and the other in salt form adsorbed in said polysilicate.

While the surcharge of alkaloid salt on the solid alkaloid polysilicate may be made less than that which gives the highest concentration of alkaloid, there is not only no advantage in using too small a proportion of excess alkaloid salt in making the spray material, but a positive disadvantage, because not only does the lethal contact action against sucking insects become too weak for practical purposes, but the process itself is affected for the reason that the base-exchange action between the polysilicate and the akaloid salt proceeds more slowly as the excess amount of salt is reduced. In other words, mass action is to be considered in connection with base-exchange phenomena, wherefore the greater the amount of alkaloid salt present, the more rapid the base-exchange action, and conversely the less the amount of alkaloid salt present the slower the said action.

While the proportions of the ingredients may be varied within considerable limits, it has been found that the proportions hereinafter given are particularly satisfactory in order to provide a spray material having a sufficiently high concentration of nicotine for practical purposes and at the same time free from the disadvantages of caking or forming lumps during storage. While if exposed to the atmosphere it may lose some of its insecticidal power, it loses its strength relatively slowly so that it may be kept for a reasonable time without too great a loss of its insecticidal power.

In order to make the product, a suitable bentonite having the required characteristics hereinbefore pointed out is suitably comminuted and graded, as by air-separation or sifting, to remove all particles which will not pass a screen of about 100 mesh. Of course, if a finer product is desired a finer mesh may be employed. The powdered material as ordinarily obtained will contain about 7% moisture. If it contains more than this it may be partly dried to the point where its moisture content is about 7%. To such a material, nicotine sulphate of 40% nicotine strength and containing about 40% water is added in considerable excess, as indicated by the proportions hereinafter given. After thoroughly mixing the materials as by grinding in a ball mill or stirring for ten minutes, a resultant product is obtained which is not a wet slurry, but only slightly damp material and hence may be readily handled by conveyers or chutes and is in excellent condition to be passed into a drier. In the drier it is subjected to a temperature ranging about 180° F. to 220° F. and is retained in such drier until substantially all the free moisture contained in the bentonite and in the nicotine sulphate has been driven off. The resultant product is the desired spray material. The relative proportions by weight of the materials at the beginning and at the end of the process are as follows:

|  | Wet | Dry |
| --- | --- | --- |
|  | *Pounds* | *Pounds* |
| Special bentonite, 7% moisture | 83 | 77.19 |
| Nicotine sulphate, 40% moisture | 39 | 23.40 |
|  | 122 | 100.59 |

The finished spray material will contain theoretically 15½% nicotine of which about 8% is generally combined with the bentonite and the remainder is in the form of nicotine sulphate which has been adsorbed by the bentonite and has been dried so as to be free from any stickiness. As the excess nicotine sulphate loses its water during the drying operation it gradually passes into the form of a jelly, adheres to and is adsorbed by the particles of bentonite powder, until finally the nicotine sulphate has been thoroughly dried and is no longer sticky. Since in this drying operation, some lumps will be formed, the dried product is run through a suitable grinder and may be graded either by airsuspension methods or sifting. The spray material in its finished form is a finely comminuted dry product which can be readily poured into and out of suitable packages and which will lose its insecticidal value relatively slowly. If charged into suitable hermetically sealed containers it may be kept for many months without appreciable loss of nicotine strength.

When it is to be used as a spray, it may be mixed with water in the usual spray tank in such proportions as are necessary to give the required strength of nicotine in the liquid spray. Generally the proportions are three pounds of the spray material to 100 gallons of water in the spray tank.

When the spray is applied to a plant, about one-half the nicotine in the spray is in the water-soluble salt and serves as a contact poison to kill sucking insects, while the remainder of the nicotine, which is in chemical combination with the bentonite, remains on the plant to act as a stomach poison to kill chewing insects.

In normal practice such a combination spray is desirable because one application of spray destroys the sucking insects and leaves a residue to protect the plant for a time against chewing insects which may then be there or come somewhat later while the spray deposit remains on the plant. However, it sometimes happens that a plague of sucking insects make it desirable to convert some or all of the nicotine which is nonvolatile and insoluble because held in chemical combination with the bentonite, into a soluble form which will be dissolved in the water of the spray, so that, when the latter contacts with sucking insects it will destroy them.

It is an important advantage of the present spray material, that the addition of some lime to the water in the tank will break up the chemical combination of the bentonite and nicotine, because lime will displace the nicotine chemically held by the bentonite, in proportion to the amount of it added to the water in the spray tank, thereby rendering soluble a proportionate amount of nicotine.

Furthermore, if it be desired to convert the spray to one which is wholly a stomach poison spray, it is only necessary to add some raw, that is, unacted upon, base-exchange material, such as bentonite of the class mentioned, to the spray tank mixture, whereupon the nicotine in the water-soluble salt will enter into base-exchange reaction with the raw bentonite, and the final product is a water-insoluble salt of nicotine, dispersed in the water by agitation, and when sprayed on a plant, serves only as a stomach poison, such a stomach poison spray material being the subject-matter of my said application.

It is to be understood that in using the spray materials of the types illustrated by the examples given hereinbefore, there will generally be used some so-called spreader material added in the spray tank when making the spray, as for example, the usual soap-like compounds. It is an advantage of the invention that solid and dry spreaders such as the lauryl alcohol compounds known as sulphates and sulphonates, and particularly such a compound now sold on the market as Orvus, may be packaged with the spray material in such proportion as to give the correct percentage of spreader in the spray tank.

It has been found that by applicant's process it is possible in regular commercial practice to provide a spray material carrying from 8 to 10% of nicotine in insoluble form and from 6 to 8% in water-soluble form, thereby providing a dry, solid, comminuted spray material which on mere admixture will be highly effective as a combination spray.

What is claimed is:

1. A preformed spray composition suitable for use in making an insecticidal aqueous spray, consisting of a solid dry comminuted polysilicate of metal selected from the group consisting of aluminum, iron in trivalent form, said polysilicate having in chemical combination an insecticidal alkaloid selected from the group consisting of nicotine, nornicotine, anabasine, and also carrying a surcharge consisting of a relatively large amount of water-soluble salt of the same alkaloid in substantially dry form adsorbed on the polysilicate.

2. A preformed spray composition suitable for use in making an aqueous insecticidal spray, consisting of a solid dry comminuted polysilicate of metal selected from the group consisting of aluminum, iron in trivalent form, said polysilicate having in chemical combination an insecticidal alkaloid selected from the group consisting of nicotine, nornicotine, anabasine and also carrying a surcharge consisting of an amount of water-soluble salt of the same alkaloid in substantially dry form adsorbed on the polysilicate, the alkaloid in the water-soluble salt being in relatively high ratio to the alkaloid in the insoluble polysilicate.

3. A preformed spray composition for use in making an aqueous insecticidal spray consisting of a solid, comminuted, insoluble polysilicate of metal selected from the group consisting of aluminum, iron in trivalent form, said polysilicate having in chemical combination about 8 to 10% of an insecticidal alkaloid selected from the group consisting of nicotine, nornicotine, anabasine, and also carrying a surcharge adsorbed on the polysilicate and consisting of such an amount of water-soluble salt of the same alkaloid as will provide about 6 to 8% of the alkaloid in the spray composition, whereby the spray composition will carry from 14 to 18% of alkaloid.

4. A preformed spray composition for use in making an aqueous insecticidal spray consisting of a solid, comminuted, insoluble complex polysilicate of nicotine and of metal selected from the group consisting of aluminum, iron in trivalent form, said nicotine polysilicate carrying an adherent surcharge of nicotine sulphate, adsorbed on the polysilicate and in such an amount as to be in a relatively high ratio to the combined alkaloid.

5. The process of producing a solid, dry combination spray material, suitable for use in making an aqueous insecticidal spray, which comprises contacting, in the presence of a limited amount of water, a comminuted solid polysilicate material having base-exchange properties and adsorptive properties with a salt of an alkaloid selected from the group consisting of nicotine, nornicotine, anabasine, the amount of such salt being sufficient to provide alkaloid in substantial excess of that necessary to satisfy the base exchange requirements of the said solid material, and then heating the products of the reaction to insure the adsorption of the excess of unreacted salt by the said solid material.

6. The process of producing an insecticidal spray material which comprises contacting solid polysilicate having base-exchange and adsorptive properties in the presence of a limited amount of water insufficient to form a slurry, with a nicotine salt in amount providing nicotine in substantial excess of that necessary to satisfy the base-exchange properties of the polysilicate, and then heating the products of the reaction to insure the adsorption of the excess of nicotine salt by the polysilicate.

7. The process of making a solid, dry nicotine spray material carrying a relatively high nicotine content, which consists in contacting in the presence of a limited amount of water insufficient to form a slurry, a solid, comminuted polysilicate having base-exchange and adsorptive properties, with an amount of nicotine sulphate in large excess of that necessary to provide nicotine sufficient to satisfy the base-exchange properties of the polysilicate, then subjecting the reaction products to a temperature of about 180° to 220° F. for a time sufficient to drive off substantially all the water and cause the adsorption and drying of the excess of nicotine sulphate by the polysilicate, and finally grinding and grading the material.

8. The process of making a dry concentrated nicotine spray material which on mere admixture with water will form an efficient combination insecticidal spray which consists in intimately mixing about 68 per cent of finely comminuted polysilicate of the bentonite type having base-exchange and adsorptive properties for nicotine and containing about seven per cent water, with about 32 per cent of nicotine sulphate having about 40 per cent nicotine and about 40 per cent water, heating the resultant damp product in a drier at a temperature of between 180° and 220° F. for a sufficient time to drive off substantially all the water, and finally grinding and grading the product.

ROBERT B. ARNOLD.